United States Patent
Conklin (10) Patent No.: US 7,530,273 B1
(45) Date of Patent: May 12, 2009

(54) MODULAR FIBER OPTIC SENSOR

(75) Inventor: John Albert Conklin, Louisville, KY (US)

(73) Assignee: John A. Conklin, Louisville, KY (US)

( * ) Notice: Subject to any disclaimer, the term of this patent is extended or adjusted under 35 U.S.C. 154(b) by 109 days.

(21) Appl. No.: 11/484,273

(22) Filed: Jul. 12, 2006

(51) Int. Cl.
*G01L 9/00* (2006.01)

(52) U.S. Cl. .............................. 73/705; 73/715; 73/788; 73/800

(58) Field of Classification Search .................. 73/788, 73/800, 700–756; 361/283.1–283.4
See application file for complete search history.

(56) References Cited

U.S. PATENT DOCUMENTS

| | | | |
|---|---|---|---|
| 4,824,206 A | 4/1989 | Klainer | |
| 4,892,383 A | 1/1990 | Klainer | |
| 5,107,133 A | 4/1992 | Klainer | |
| 5,313,160 A | 5/1994 | Gloden et al. | |
| 5,349,867 A * | 9/1994 | Park .............................. | 73/727 |
| 5,386,732 A | 2/1995 | Scotto | |
| 5,438,876 A | 8/1995 | Lewis | |
| 5,456,106 A | 10/1995 | Harvey et al. | |
| 5,522,267 A | 6/1996 | Lewis | |
| 5,828,290 A | 10/1998 | Buss et al. | |
| 5,918,194 A | 6/1999 | Banaska et al. | |
| 6,031,448 A | 2/2000 | Starkweather et al. | |
| 6,195,013 B1 | 2/2001 | Robinson | |
| 6,232,769 B1 | 5/2001 | Brunsch et al. | |
| 6,289,751 B1 | 9/2001 | Mathur et al. | |
| 6,487,913 B2 * | 12/2002 | Debesis et al. ................. | 73/800 |
| 6,532,434 B1 | 3/2003 | West | |
| 6,559,636 B1 | 5/2003 | Brunsch et al. | |
| 6,658,915 B2 | 12/2003 | Sunshine et al. | |
| 6,660,994 B1 * | 12/2003 | Pangilinan et al. ..... | 250/227.14 |
| 6,822,744 B1 | 11/2004 | Fischer et al. | |
| 6,883,364 B2 | 4/2005 | Sunshine et al. | |
| 7,134,343 B2 * | 11/2006 | Suzuki et al. ................. | 73/655 |

OTHER PUBLICATIONS

E. Udd, Fiber Optic Sensors: An Introduction for Engineers and Scientists, John Wiley and Sons, Inc, New York, NY 1991 pp. 1-8.
G.T.A. Kovacs, Micromachined Transducers Sourcebook, WCB McGraw-Hill, New York, NY 1998 pp. 357-528.
Keigo Iizuka, Elements of Photonics vol. II, John Wiley and Sons, New York, NY 2002 pp. 1011-1013.
M. E. Motamidi, MOEMS Micro-Optical-Electro-Mechanical Systems, SPIE Press, Bellingham, WA, 2005 pp. 1-25.
R. W. Waynant and M. N. Ediger, Electro-Optics Handbook, 2nd Edition, McGraw-Hill, Inc, New York, NY 2000. pp. 21.1-21.28.

(Continued)

*Primary Examiner*—Andre J Allen
*Assistant Examiner*—Jermaine Jenkins (57) ABSTRACT

A modular fiber optic sensor that uses a light source to transmits light through at least one optical fiber to a sensor support. The sensor support is releasably attached to the optical fiber(s) allowing the use of both a single and multiple fibers. Diaphragms are exchangably attached to the sensor support allowing numerous diaphragm configurations to be attached to the sensor support. The different diaphragm configurations allow the sensor to detect a wide range of physical phenomena. A detection system is coupled to the optical fiber(s) that determines the change in light intensity which is reflected from the diaphragm's reflector.

28 Claims, 12 Drawing Sheets

OTHER PUBLICATIONS

J. A. Conklin, P.J. Ouseph, and H.L. Cox, A modular, fiber-optic sensor for micro-optical mechanical sensor education, Amer. J. of Phys., 75, 8, pp. 760-763, Aug. 2007.

J. A. Conklin, A modular Optical Sensor, Dissertation, University of Louisville, Oct. 2006 (Complete Document).

T. Tamir, Guided Wave Opto-Electronics, 2nd Edition, Springer Verlag, New York, NY 1990 pp. 317-395.

Optical Fiber Sensors: Principles and Components Volume One Edited by J. Dakin and B. Culshaw, 1988, Artech House pp. 1-24.

Optical Fiber Sensors: Systems and Applications Volume Two Edited by J. Dakin and B. Culshaw, 1989, Artech House pp. 475-509.

Optical Fiber Sensors: Systems and Applications Volume Two Edited by J. Dakin and B. Culshaw, 1989, Artech House pp. 653-699.

Optical Fiber Sensors: Components and Subsystems Volume Three Edited by J. Dakin and B. Culshaw, 1989, Artech House pp. 1-8.

Optical Fiber Sensors: Applications, Analysis and Future Trends Volume Four Edited by J. Dakin and B. Culshaw, 1989, Artech House pp. 261-308.

* cited by examiner

MODULAR FIBER OPTIC SENSOR

BACKGROUND OF THE INVENTION

The present invention relates generally to fiber optic based sensors. Fiber optic sensors have been designed to detect a wide number of phenomena and are free from the problems of radiating electromagnetic fields (EMF) and are not susceptible to noise cause by electromagnetic interference (EMI). Further, fiber optic sensors can be used in a number of environments including high temperature and toxic environments with little or no degradation in performance.

Fiber optic based sensors are designed to detect one, possibly two, physical phenomena and the prior art sensors cannot be substantially modified or changed once constructed. This creates a problem in the manufacturability of a wide range of fiber optic sensors in that each type of sensor is made from substantially different components using substantially different fabrication and/or construction methods resulting in higher costs as compared to sensors based on electrical detection methods.

Prior art fiber optic sensors are limited to the practice of a specific optical detection method and a specific transduction mechanism that cannot be changed once the sensor is fabricated or constructed. This means that the end user has to use the detection method the fiber optic was designed for. The majority of the detection methods used simply are not required because the sensitivity is not required for the particular uses of the fiber optic sensors. For example, if a sensor is interrogated using interfermetric detection with light polarization detection equipment, the cost is very high. However, an interferometric technique may not be required and a less expensive interrogation technique, such as multifiber intensity detection, may be sufficient. The sensor described in this document allows the user to pick and select the detection system that is sufficient for said users needs.

It is therefore desirable to provide a modular fiber optic sensor that can be easily modified to detect a wide range of phenomena while also allowing the user to choose the detection method used to interrogate the sensor.

SUMMARY OF THE INVENTION

One feature of the present invention is the sensor support that allows diaphragms of different types and configurations to be exchangably connected to the sensor support. As used herein, "exchangably" shall be used in conjunction with a diaphragm that is modular in character, that can easily and manually be removed from the optical sensor, and that is easily and manually replaced with another diaphragm attached to the optical sensor.

The ability to use different diaphragms of different configurations results in a great advantage in manufacturing optical sensors because all sensor components are the same except for the diaphragms. Another advantage of being able to remove and replace the diaphragms allows the user to purchase the individual parts and configure the sensor to detect the physical phenomena that the user would like to detect. Yet another advantage of being able to exchange diaphragms is the longevity of the device is greatly increased.

Another feature of the invention is one or more optical fibers can be used to interrogate the sensor. Importantly, the optical fiber or fibers can be releasably attached to the sensor support. This releasably feature has the advantage of allowing the user to empirically determine what detection mechanism results in the most cost efficient utilization of the present invention. Additionally, this aspect of the invention also allows a wide range of diaphragms designs and configurations to be used with the sensor enabling the sensor to detect a variety of preselected phenomena. The preselected phenomena can be, but are not limited to, pressure, temperature, flow, sound, force, and chemical detection.

It is the novel and unique interaction of these simple elements which creates the apparatus and methods, within the ambit of the present invention. Pursuant to Title 35 of the United States Code, descriptions of preferred embodiments follow. However, it is to be understood that the best mode descriptions do not limit the scope of the present invention.

BRIEF DESCRIPTION OF THE DRAWINGS

Other features and advantages of the present invention will become apparent from the following detailed description which should be read in conjunction with the drawings, in which:

FIGS. 16 A and 16B show a fiber probe configuration containing a single fiber wherein one end of the fiber probe has an angle between 0° and 8° to minimize back reflections;

DETAILED DESCRIPTION OF THE INVENTION

Although the disclosure hereof is detailed to enable those skilled in the art to practice the invention, the embodiments published herein merely exemplify the present invention.

Referring now to the drawings by the reference numerals that are used to identify specific components on the invention. The invention is a modular sensor, and as can be appreciated, many preferred embodiments of the invention are disclosed.

Figure 1:
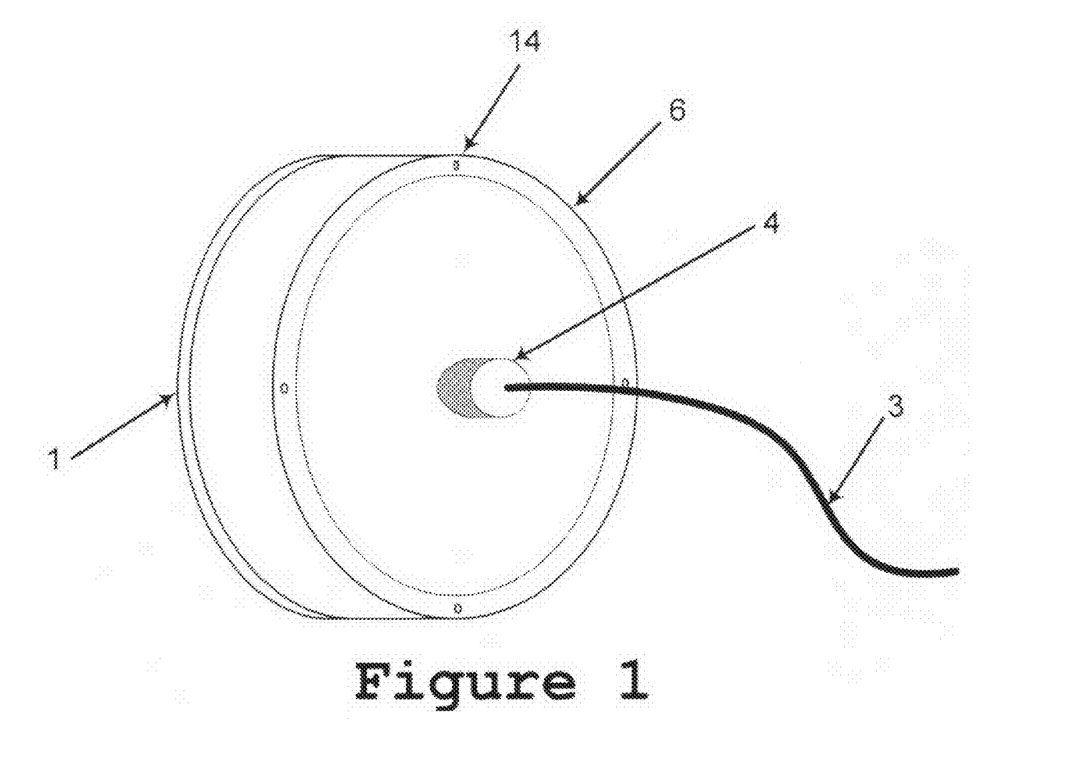
FIG. 1 is a photo of a modular sensor configured as a microphone with a multifiber intensity detection system.

Referring now to FIG. 1, a photo of a first prototype of the invention is shown on a optical table. The photo is taken from the back of the sensor showing the fiber probe protruding from the back portion of the fiber.

Figure 2:
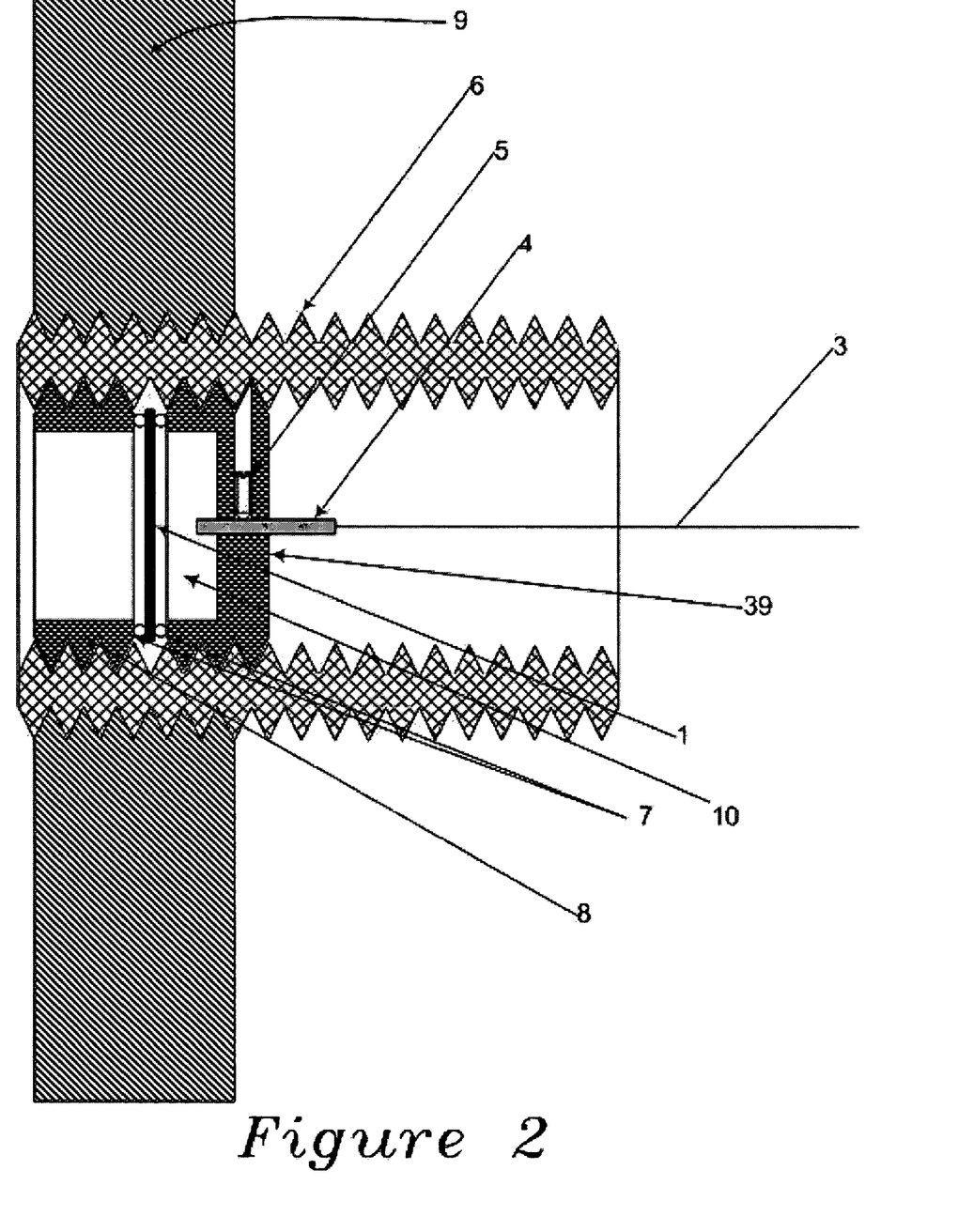
FIG. 2 is a cross-sectional view of an embodiment of the modular sensor.

Referring now to FIG. 2, a cross-sectional view of one embodiment of the sensor where the diaphragm 1 is retained in the sensor support 6 by a first retaining ring 8 and a second retaining ring sealed with o-rings 7. The second retaining ring 39 has a setscrew 5 that holds the fiber probe 4 containing the optical fiber 3. The second retaining ring 39 is milled out so that the second retaining ring forms a space 10 between the fiber probe and the diaphragm 1. The sensor is screwed into a wall 9.

The sensor support 6, and retaining rings 39 and 8 can be constructed of metallic, polymeric, ceramic, or hybrid materials. The diaphragm 1 can be fabricated from metal, polymeric, ceramic or hybrid materials as well. Diaphragms are composed of preselected compositions to detect specific phenomena. By way of illustration, diaphragms of the present modular sensor can be composed of metals, such as but not limited to aluminum, steel, and brass, polymers, such as but not limited to polyimide, polyethylene, Teflon, Nitrocellulose, acrylate, and polycarbonate, or dielectric materials, such as but not limited to glass, diamond, BK7, Quartz. Depending on the preselected composition of the diaphragms, changes in temperature, flow, magnetic fields, gas density or pressure can be measured. Diaphragms can also be coated with a polymeric coating sensitive to pressure and/or temperature providing for the transparency of the diaphragm to be altered with the changes in pressure and/or temperature. Examples of such coatings are temperature-sensitive liquid crystal material, thermochromic paints, temperature-Sensitive Ink, and lysolipid temperature sensitive liposomes.

Figure 3A:
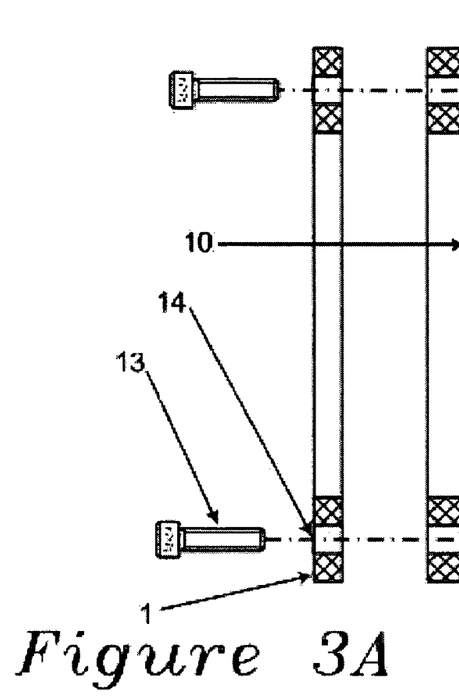
FIGS. 3A and 3B are cross-sectional views of another embodiment of the modular sensor.
Figure 3B:
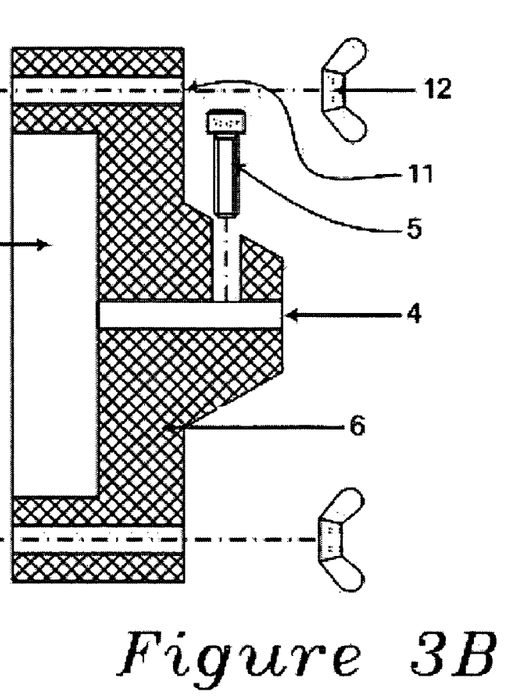

FIG. 3 is a cross-sectional side view of one embodiment of the modular sensor where the diaphragm 1 is attached to a sensor support 6 by a cap screw 13 through a hole 14 in the diaphragm 1 and a hole in the sensor support 11 and tightened with a nut 12. The sensor support has a slot 4 to receive a fiber probe and a setscrew 5 to hold the fiber probe (not shown in this view) in a releasable fashion. The sensor support 6 has a milled out area to form a space 10 between the fiber probe (not shown in this view) and the diaphragm 1.

Figure 4:
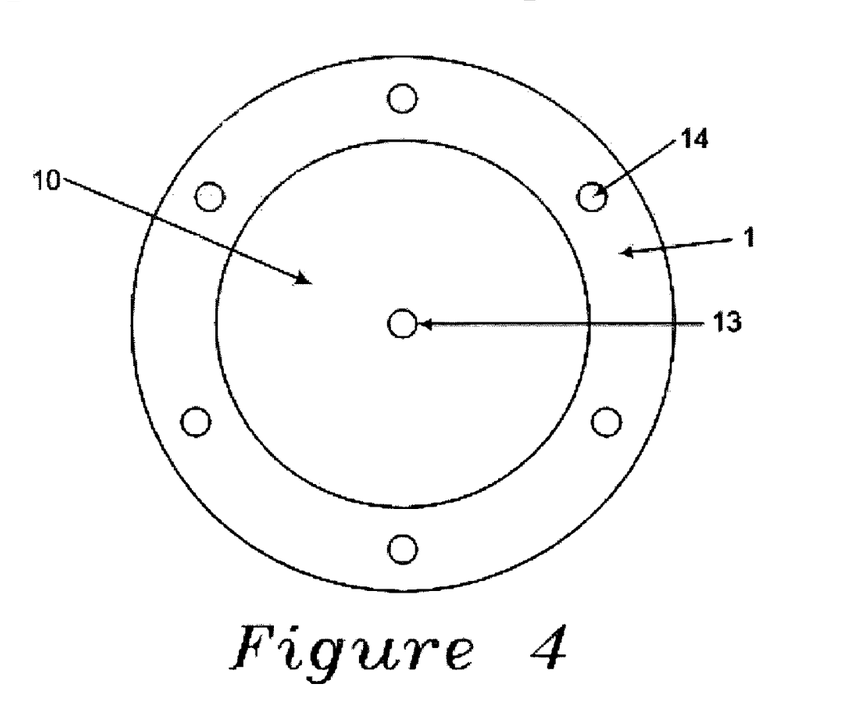
FIG. 4 is a frontal view of the embodiment shown in FIG. 3.

The sensor support 6 and diaphragm 1 can be milled, injection molded, molded, stamped, or formed by adhering layers of material together. Additionally, the sensor support 6 and diaphragm 1 can be composed of polymeric, metallic materials or hybrids. FIG. 4 is a frontal view of the embodiment presented in FIG. 3 where the diaphragm 1 includes a hole 14 to receive a cap screw and a hole 13 to receive the fiber probe.

Figure 5A:
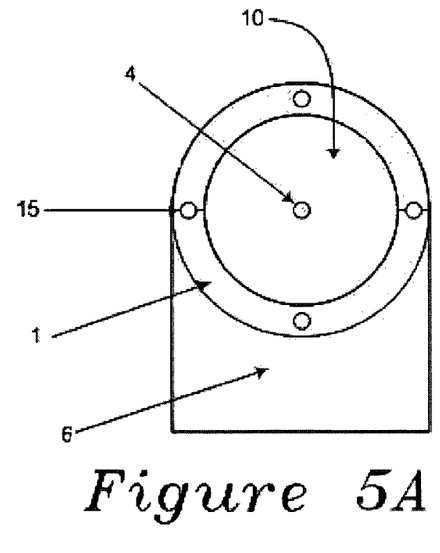
FIGS. 5A and 5B show an embodiment of the sensor utilizing a circular diaphragm and a simple set screw to releasably attach the fiber to the sensor.
Figure 5B:
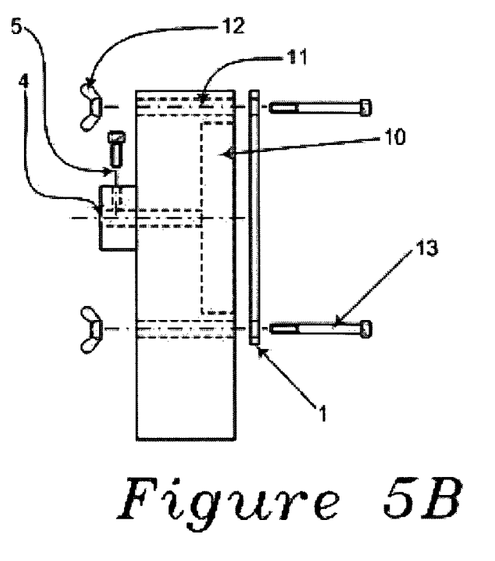

Referring now to FIGS. 5A a frontal view and 5B a cross-sectional side view of one embodiment of the modular sensor that is similar to the embodiment presented in FIG. 3 where the sensor support 6 is extended to rest securely on a flat surface.

Figure 6A:
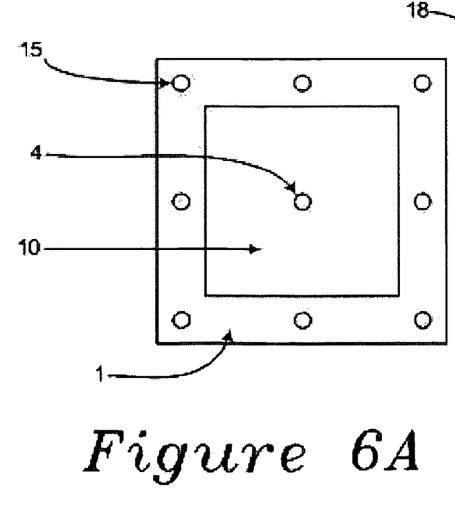
FIGS. 6A and 6B disclose an embodiment of the sensor utilizing a square diaphragm and a spring loaded mechanism to releasably attach the fiber to the sensor.
Figure 6B:
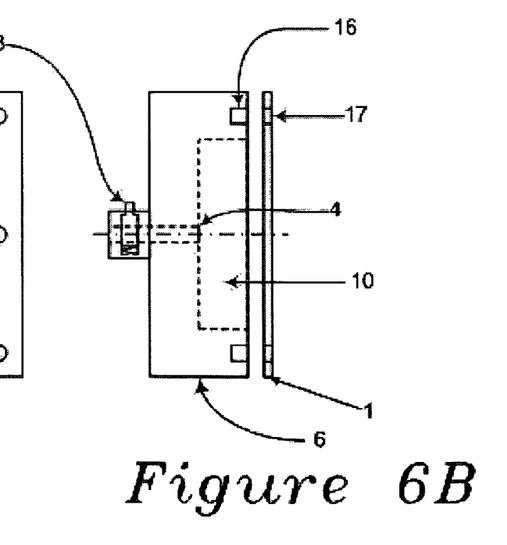

FIGS. 6A and 6B are a frontal view and a cross-sectional side view of an embodiment of the modular sensor. Diaphragm 1 is square and a fiber sensor is held into place with a depressible spring mechanism 18. The diaphragm 1 is magnetically held into place on the sensor support 6. Magnets 16 are placed within the sensor support 6 and a magnetic material 17 is placed within the diaphragm 1.

Figures 7A, 7B:
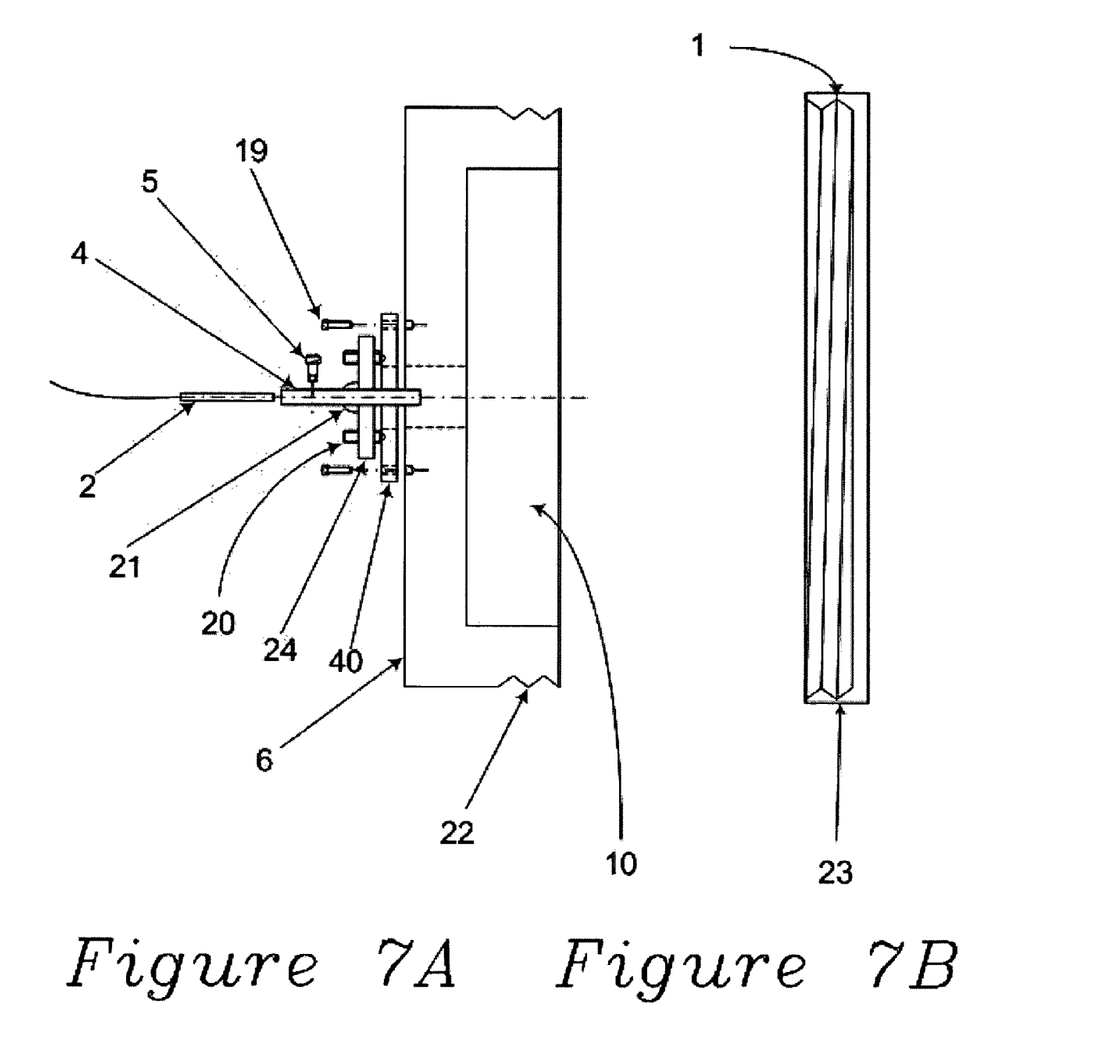
FIG. 7 teaches an embodiment of the sensor utilizing a triangular diaphragm and an assembly to releasably attach the fiber to the sensor where the assembly can also adjust the fiber in the x, y, and z directions.

FIG. 7 is a cross-sectional side view of one embodiment of the modular sensor where the diaphragm 1 has a threaded portion 23 which screws onto threads 22 on the sensor support 6. The fiber probe 2 is placed into the fiber holder 4 and held into place with a set screw 5 where the fiber holder is connected to a plate 24 that is tensionably connected to a second plate 40 where screws 19 can move the fiber probe 2 in pitch and yaw. A threaded component 21 can move the fiber probe 4 towards and away from the diaphragm 1.

Figure 8:
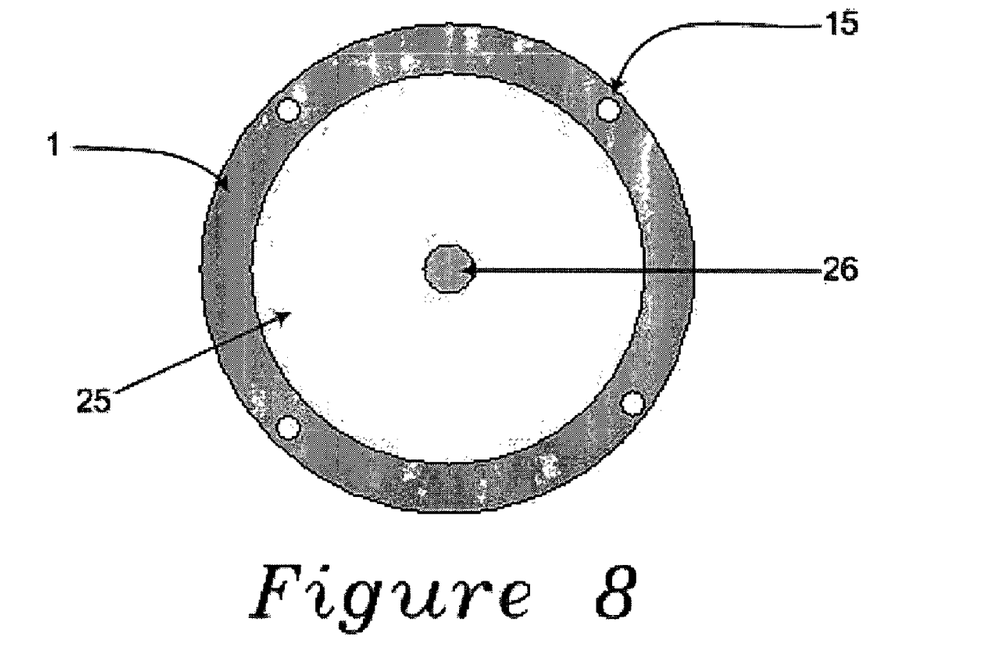
FIG. 8 depicts a diaphragm that is membrane like with a reflective structure centered on the membrane.

Referring now to FIG. 8, the diaphragm 1 is adhered to a thin plastic layer 25 with a mirror 26 attached to the center of the plastic layer 25. Plastic layer 25 can be composed of, but not limited to, but not limited to polyimide, polyethylene, Teflon, nitrocellulose, acrylate, and polycarbonate.

Figure 9:
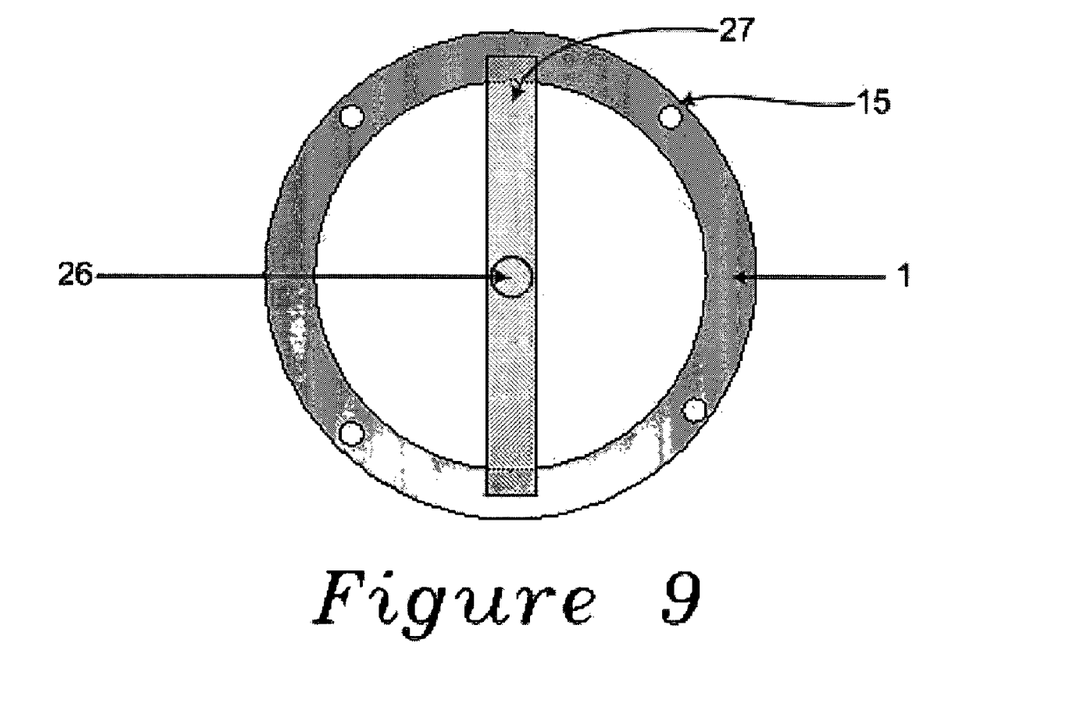
FIG. 9 portrays a diaphragm that is a ring with a bimetallic strip centered in the ring with a reflective structure on the bimetallic strip.

Referring now to FIG. 9, the diaphragm 1 has a bimetallic strip 27 incorporated with a mirror 26 attached to the center of the bimetallic strip. Bimetallic strip 27 can be composed of iron and aluminum, iron and copper, and brass and invar.

Figure 10A:
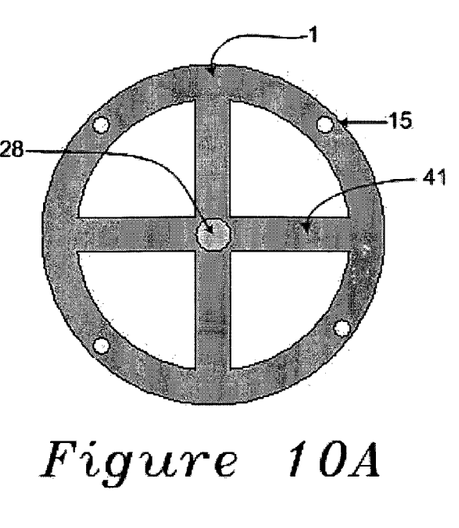
FIG. 10 shows a diaphragm with four arms connected at the center of the diaphragm where a magnetic material is adhered to one side of the diaphragm and a reflective structure is adhered to the other side of the diaphragm.
Figure 10B:
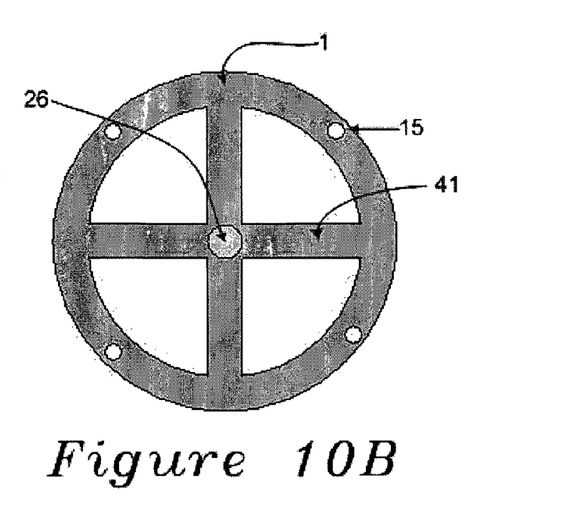

Referring now to FIG. 10, the diaphragm 1 includes four intersecting arms 41 connected to one another at the center of the diaphragm and mirror 26 is also attached to the center of the diaphragm. Intersecting arms 41 can be composed of, but not limited to, metals, such as aluminum, steel, and brass, polymers, such as polyimide, polyethylene, Teflon, nitrocellulose, acrylate, and polycarbonate, or dielectric materials, such as glass, diamond, BK7, Quartz.

Figure 11:
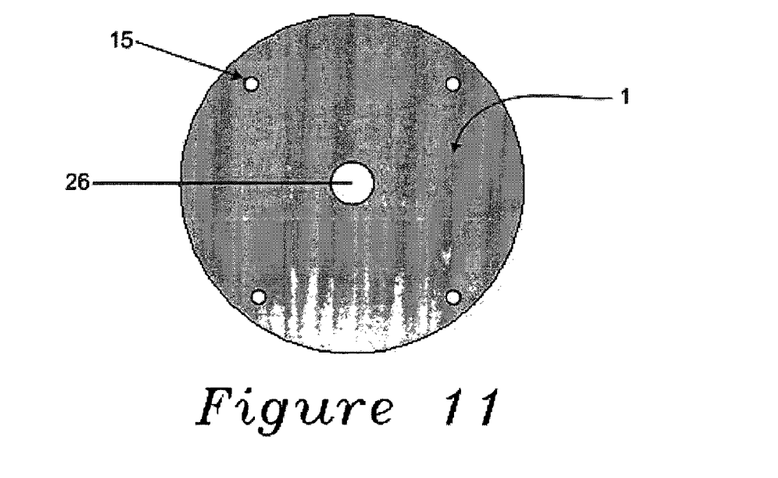
FIG. 11 teaches a diaphragm composed of a metallic plate.

Referring now to FIG. 11, the diaphragm 1 is a contiguous piece of material with a mirror 26 adhered to the center of the diaphragm 1, where the materials can include, but are not limited to, metals, such as aluminum, steel, and brass, polymers, such as polyimide, polyethylene, Teflon, nitrocellulose, acrylate, and polycarbonate, or dielectric materials, such as glass, diamond, BK7, Quartz.

Figures 12A, 12B:
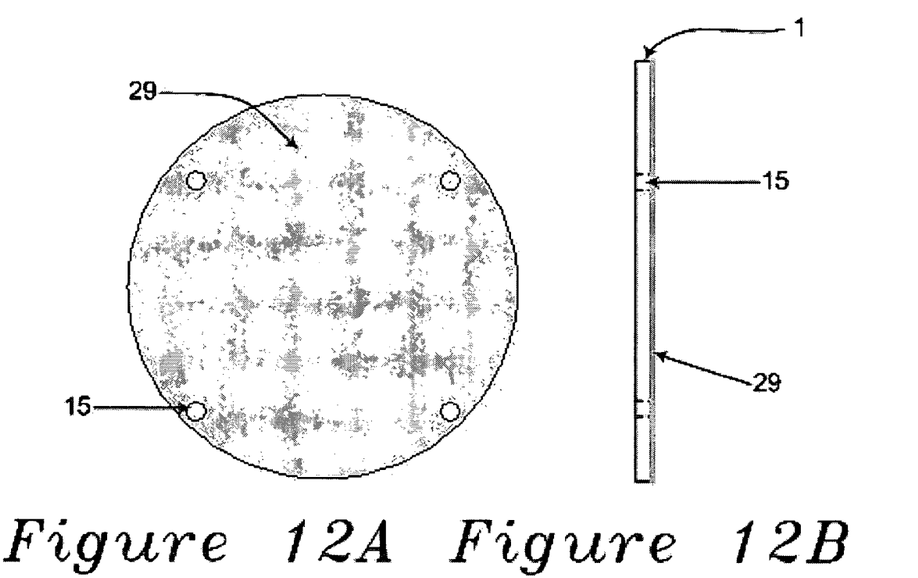
FIGS. 12A and 12B disclose a diaphragm composed of a optically transparent material and coated with a material whose optical properties change with a change in a physical phenomena.

Referring now to FIGS. 12A and 12B, the diaphragm 1 is a contiguous piece of optically transparent material with a coating 29 whose optical properties change in response to a change in a physical phenomena. Within the scope of the present invention, optically transparent materials can include polymers, such as polyimide, polyethylene, Teflon, nitrocellulose, acrylate, and polycarbonate, or dielectric materials, such as glass, diamond, BK7, Quartz. Coatings 29 applied to the optically transparent materials can include pressure sensitive paints, ProCling pressure sensitive film, and thermochromic paints.

Figures 13A, 13B:
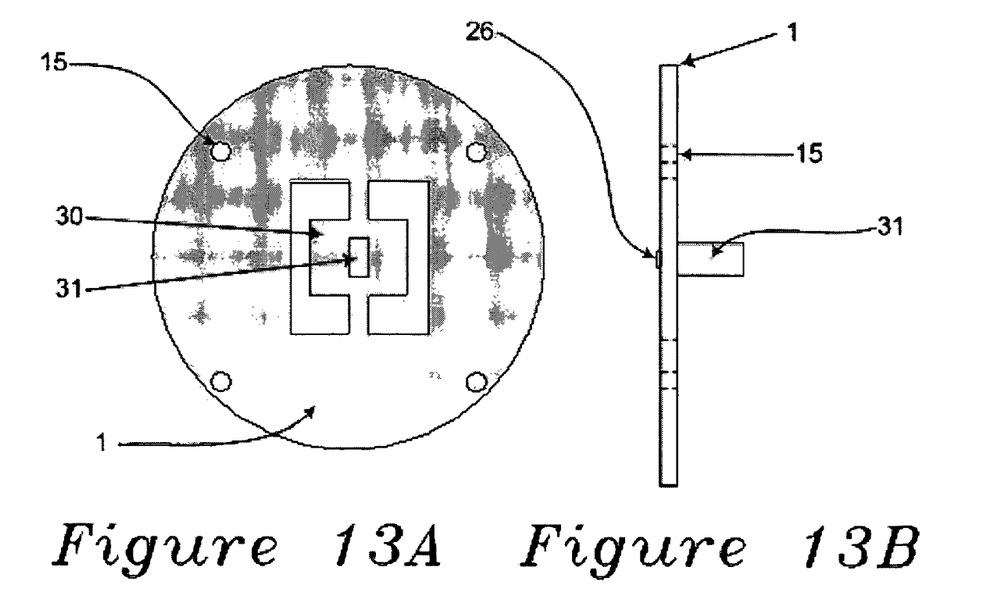
FIGS. 13A and 13B teach a diaphragm including a central two beam structure where on a first side of the two beam structure a paddle is attached and a reflective structure is attached to a second side.

Referring now to FIGS. 13A and 13B, the diaphragm 1 has a central portion 30 that has a paddle 31 oriented 90° to the surface of the diaphragm 1. The central portion 30 is rotably movable when a force is applied to the paddle 31. The diaphragm 1 has a mirror 26 adhered to the central member 30 on the side opposite the paddle 31.

Figures 14A, 14B:
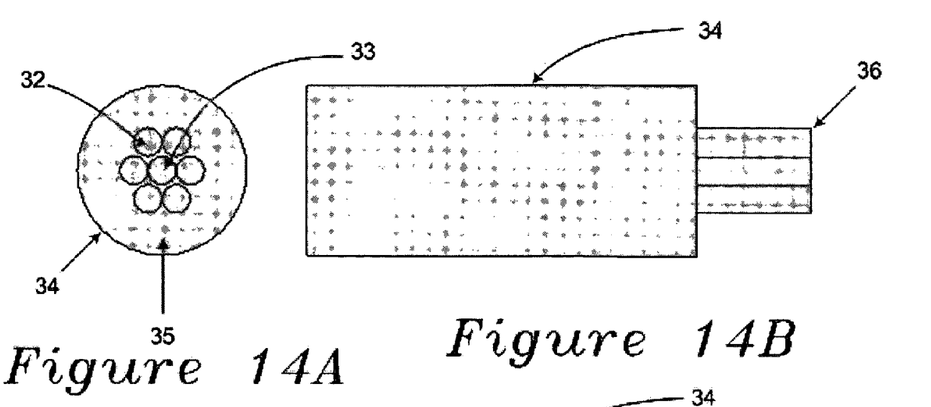
FIGS. 14A and 14B show a fiber probe configuration containing a plurality of optical fibers wherein the central fiber is a illuminating fiber and the other fibers are light receiving fibers.

Referring now to FIGS. 14A and 14B, a first possible fiber probe head configuration is shown for use with the modular sensor wherein the probe head 34 has a plurality of optical fibers 32 and an optical fiber 33. The central fiber 33 is an illuminating fiber and the plurality of surrounding fibers 32 are receiving fibers. The optical fibers 33 and 32 are held into the probe head 34 with an epoxy matrix 35. The fibers 36 are allowed to extend from one end of the fiber probe 34 and are polished flush on the other end 42.

Figures 15A, 15B:
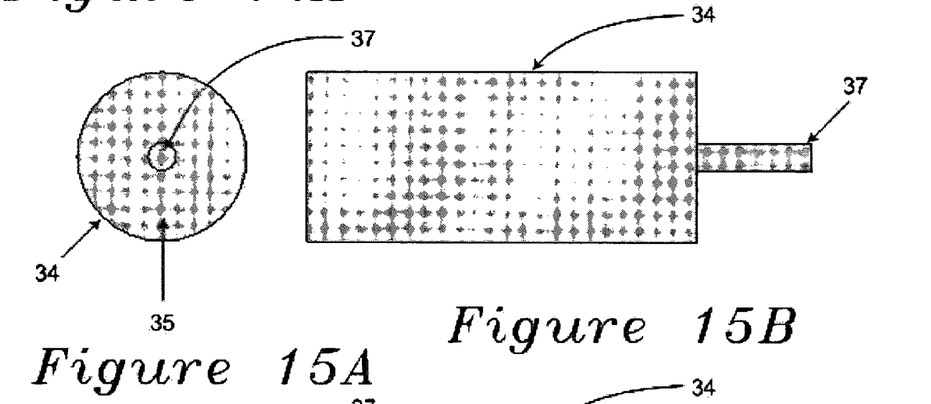
FIGS. 15A and 15B portray a fiber probe configuration containing a single fiber that can be used with interferometric detection systems or velocimetry detection systems.

Referring now to FIGS. 15A and 15B, another possible fiber probe head configuration is shown for use with the modular sensor where the probe head 34 has a single optical fiber 37 centrally located in the probe head 34. The single fiber 37 is held in place within the probe head 34 with a epoxy matrix 35. The single optical fiber 37 protrudes from one side of the probe head 34 and is polished flush on the opposite side 42 of the probe head 34.

Figures 16A, 16B:
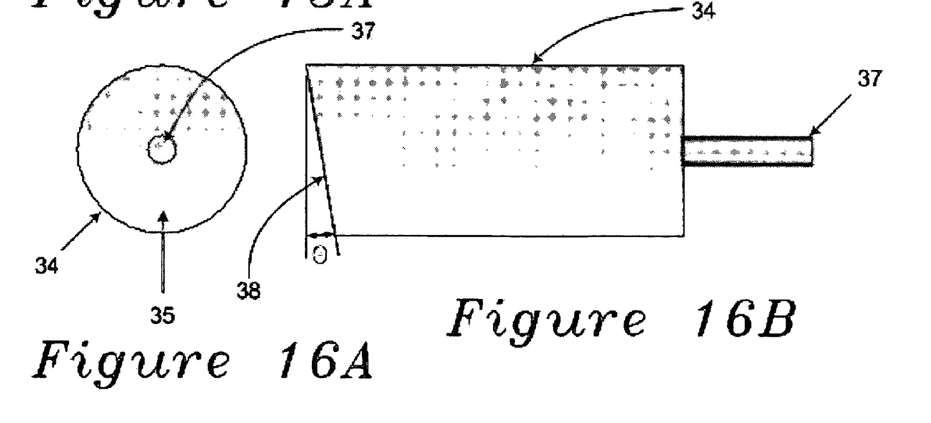

Referring now to FIGS. 16A and 16B, a still another possible fiber probe head configuration is shown for use with the modular sensor where the probe head 34 has a single optical fiber 37 centrally located and held into place with an epoxy matrix 35. The single optical fiber 37 protrudes from one end of the probe head 34 and is polished flush with the other end 38 of the probe head 34. As shown, head 34 is slanted at an angle between 1° and 10°.

The probe head 34 can be formed by injection molding a polymeric or hybrid material around the fiber and then cleaving and polishing the fibers on one end of the probe head 34. In the alternative the probe head 34 can be fabricated by centrally placing the optical fibers in a sleeve and epoxying the fibers into place. After the epoxy cures the fibers on one end of the probe head 34 can be cleaved and polished. The sleeve can be composed of a metal, polymer, or hybrid material.

Figure 17:
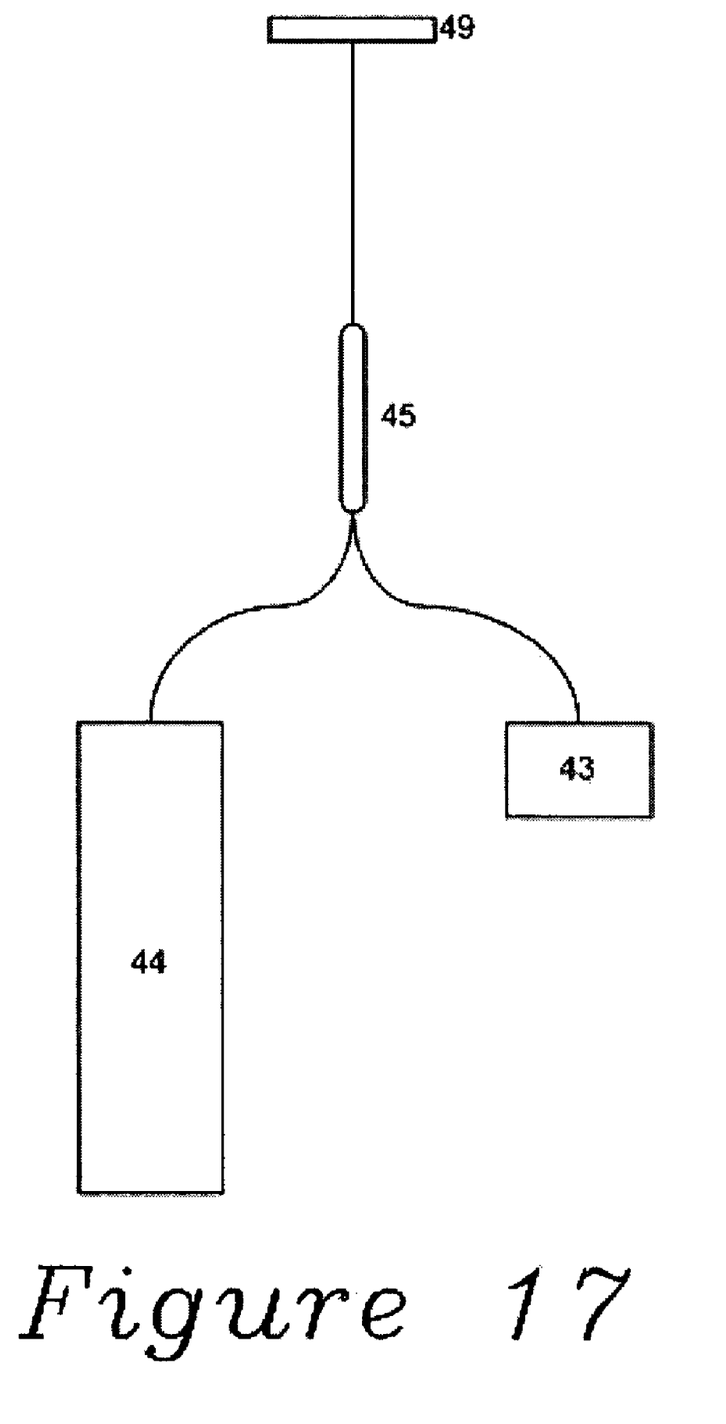
FIG. 17 represents a velocimetric optical interrogation technique that can be used to interrogate a signal from the sensor.

FIG. 17 represents a possible optical interrogation technique based on velocimetry that can be used to interrogate a signal from the modular optical sensor 49. In accordance with the present invention, the velocimetric technique utilizes a two by one fiber optic coupler 45 that receives light from a light source 44 where the light reflected from the sensor is detected by optical detector 43. The optical coupler 45 can be comprised of single or multimode optical fibers.

Figure 18:
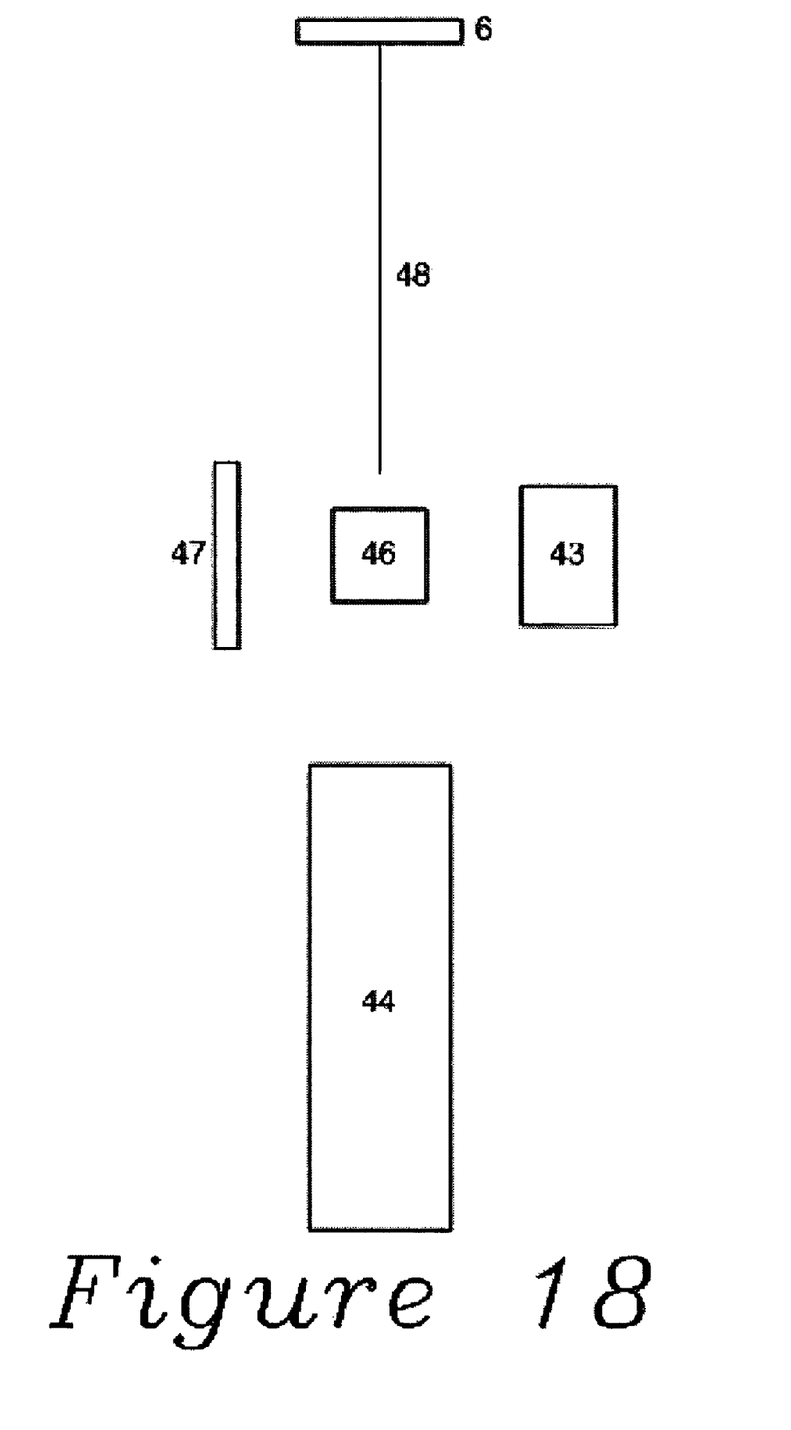
FIG. 18 represents an interferometric optical interrogation technique based on a Michelson interferometer that can be used to interrogate a signal from the sensor.

FIG. 18 depicts a possible optical interrogation technique utilizing a michelson interferometer to interrogate a signal from the modular optical sensor 49. The light from the light source 44 is directed a beam splitter 46 where 50% of the light is directed to a reference mirror 47 and 50% of the light is directed to the modular optical sensor 49 through an optical fiber 48. The light reflected from the modular optical sensor 49 is directed back to the beam splitter 46 via an optical fiber 48 and recombined with the light from the reference mirror 47 and detected on a optical detector 43.

Figure 19:
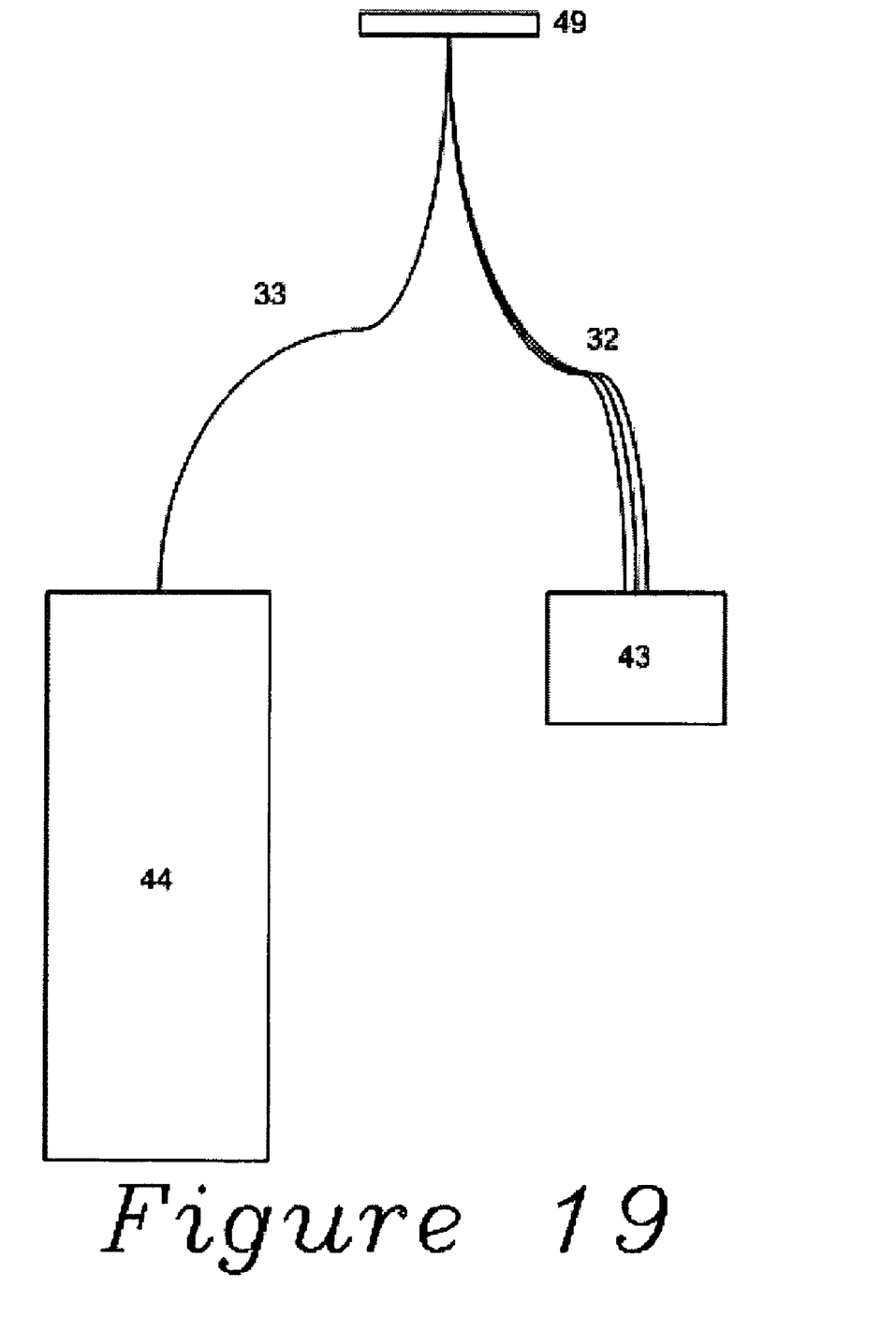
FIG. 19 represents an optical lever interrogation technique that can be used to interrogate a signal from the sensor.

FIG. 19 discloses another optical interrogation technique utilizing optical leverage to interrogate a signal from the modular optical sensor 49. Light is directed from a light source 44 to the modular optical sensor 49 through at least one illuminating fiber 33. The light reflected from the sensor is directed through at least one light receiving optical fiber 32 to the optical detector 43.

Having disclosed the invention as required by Title 35 of the United States Code, Applicant respectfully requests that Letters Patent be granted for his invention in accordance with the scope of the claims appended hereto.

What is claimed is:

1. A modular sensor comprising:
a) a support;
b) a plurality of diaphragms composed of differing compositions, wherein one of said plurality of diaphragms is exchangebly attached to said support;
c) a reflective surface abutting said diaphragm;
d) at least one optical fiber connected to said support and radiating light toward said reflective surface; and
e) a light receiving optical fiber receiving radiated light reflected from said reflective surface.

2. The invention of claim 1, wherein said diaphragms are composed of metallic, polymeric, ceramic, or hybrid materials.

3. The invention of claim 1, wherein said diaphragms further comprise one or more metallic strips or arms.

4. The invention of claim 1, wherein said diaphragms are composed of metallic, polymeric, ceramic, or hybrid materials.

5. The invention of claim 4, wherein said probe further comprises a plurality of optical fibers radiating toward said reflective surface.

6. The invention of claim 5, wherein said wherein said diaphragm further comprises one or more metallic strips or arms.

7. The invention of claim 4, wherein pressure and/or temperature alters translucency of said diaphragm.

8. The invention of claim 7, wherein said diaphragm further comprises a polymeric coating.

9. A modular sensor comprising:
a) a support;
b) a diaphragm exchangebly attached to said support;
c) a reflective surface positioned intimately with said diaphragm; and
d) a probe releasably attached to said support, wherein said probe houses a first optical fiber radiating light toward said reflective surface and a second optical fiber receiving light reflected by said reflective surface.

10. A modular optical sensor comprising:
a) a support further comprising a cavity therein;
b) a diaphragm exchangeably attached to said support and abutting said cavity;
c) a reflective surface positioned on said diaphragm; and
d) an adjustable probe releasably attached to said support, wherein said probe houses a first optical fiber radiating light toward a said reflective surface and a second optical fiber receiving light reflected by said reflective surface.

11. The invention of claim 10, wherein said diaphragm is composed of metallic, polymeric, ceramic materials or hybrid materials.

12. The invention of claim 11, wherein said diaphragm further comprises metallic strips or arms.

13. The invention of claim 11 further comprising a paddle abutting said diaphragm.

14. The invention of claim 11 wherein said adjustable probe is adjustable relative to said adjustable probe's x, y and z axes for directing radiated light toward said reflective surface.

15. The invention of claim 14 further comprising a latch releasably attaching said probe to said support.

16. The invention of claim 15, wherein said adjustable probe further comprises an slanted end.

17. The invention of 14, wherein said magnetic field exchangably attaches said diaphragm to said support.

18. The invention of claim 14, wherein said diaphragm further comprises threads.

19. The invention of claim 14, wherein temperature and/or pressure alters translucency of said diaphragm.

20. The invention of claim 19, wherein said diaphragm a polymeric coating.

21. A method of interrogating an optical modular sensor and sensing changes in temperature, pressure, density, flow or magnetism, comprising the steps of:
a) placing said modular optical sensor in an environment to measure said temperature, said pressure, said density, said flow or said magnetism, wherein said modular optical sensor comprises:
i) a support having a cavity therein;

ii) a plurality of diaphragms composed of differing compositions sensitive to changes in said temperature, said pressure, said density, said flow or said magnetism or a combination of said temperature, said pressure, said density, said flow and said magnetism, wherein one of said plurality of diaphragms is exchangably attached to said support and nestled with said cavity; and iii) a reflective surface positioned on said diaphragm;

b) releasably attaching an adjustable probe, wherein said adjustable probe further comprises a first optical fiber radiating light toward said reflective surface and a second optical fiber receiving light reflected by said reflective surface;

c) supplying light from a light source to said adjustable probe; and d) transmitting reflected light received by said adjustable probe to an optical detector.

22. The method of claim 21 further comprising the step of coupling a fiber optic coupler between said light source, said optical detector and said adjustable probe.

23. The method of claim 22, wherein said light source is a laser, light emitting diode or broadband light.

24. The method of claim 22 further comprising the step of slanting an end of said adjustable probe.

25. The method of claim 21 further comprising the step of positioning a beam splitter and a reference mirror between said light source and said probe.

26. The method of claim 25, further comprising the steps of:
   a) directing approximately one-half of said light source's light toward said referece mirror; and
   b) directing approximately one-half of said light source's light toward said probe.

27. The method of claim 21 further comprising the step of adjusting said adjustable probe relative to said adjustable probe's x, y and z axes.

28. The method of claim 27 further comprising the step of securing a plurality of optical fibers radiating light toward said reflective surface.

* * * * *